United States Patent
Ando

(10) Patent No.: US 9,552,536 B2
(45) Date of Patent: Jan. 24, 2017

(54) IMAGE PROCESSING DEVICE, INFORMATION STORAGE DEVICE, AND IMAGE PROCESSING METHOD

(71) Applicant: OLYMPUS CORPORATION, Shibuya-ku, Tokyo (JP)

(72) Inventor: Jun Ando, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/878,210

(22) Filed: Oct. 8, 2015

(65) Prior Publication Data

US 2016/0026900 A1    Jan. 28, 2016

Related U.S. Application Data

(63) Continuation of application No. PCT/JP2014/056886, filed on Mar. 14, 2014.

(30) Foreign Application Priority Data

Apr. 26, 2013   (JP) ................................ 2013-093344

(51) Int. Cl.
 *G06K 9/62*  (2006.01)
 *G06K 9/46*  (2006.01)
 *G06K 9/72*  (2006.01)

(52) U.S. Cl.
 CPC .......... *G06K 9/6262* (2013.01); *G06K 9/4642* (2013.01); *G06K 9/4671* (2013.01); *G06K 9/6256* (2013.01); *G06K 9/4676* (2013.01); *G06K 9/72* (2013.01)

(58) Field of Classification Search
 None
 See application file for complete search history.

(56) References Cited

U.S. PATENT DOCUMENTS 5,862,259 A  *  1/1999  Bokser ................... G06K 9/344
                                                    382/156
7,869,648 B2 *  1/2011  Schiller .................. G06K 9/342
                                                    382/159
(Continued)

FOREIGN PATENT DOCUMENTS

| JP | 2008282267 A | 11/2008 |
| JP | 2011145791 A | 7/2011  |
| JP | 2011150541 A | 8/2011  |

OTHER PUBLICATIONS

International Search Report (ISR) dated Jun. 3, 2014 issued in International Application No. PCT/JP2014/056886.

*Primary Examiner* — Randolph I Chu
(74) *Attorney, Agent, or Firm* — Holtz, Holtz & Volek PC

(57) ABSTRACT

An image processing device includes an input reception section that receives a learning image and a correct answer label, a processing section that performs a process that generates classifier data and a processing target image, and a storage section. The processing section generates the processing target image that is the entirety or part of the learning image, calculates a feature quantity of the processing target image, generates the classifier data based on training data that is a set of the feature quantity and the correct answer label assigned to the learning image that corresponds to the feature quantity, generates an image group based on the learning image or the processing target image, classifies each image of the image group using the classifier data to calculate a classification score of each image, and regenerates the processing target image based on the classification score and the image group.

19 Claims, 11 Drawing Sheets

(56) References Cited

U.S. PATENT DOCUMENTS

| | | | |
|---|---|---|---|
| 8,484,139 B2* | 7/2013 | Hori | G06K 9/6271 |
| | | | 706/12 |
| 2003/0037036 A1* | 2/2003 | Weare | G06F 17/30598 |
| 2003/0174889 A1* | 9/2003 | Comaniciu | G06K 9/342 |
| | | | 382/173 |
| 2008/0279460 A1 | 11/2008 | Kasahara et al. | |
| 2011/0170769 A1 | 7/2011 | Sakimura et al. | |
| 2011/0176725 A1 | 7/2011 | Homma et al. | |
| 2014/0029839 A1* | 1/2014 | Mensink | G06K 9/6272 |
| | | | 382/159 |

* cited by examiner

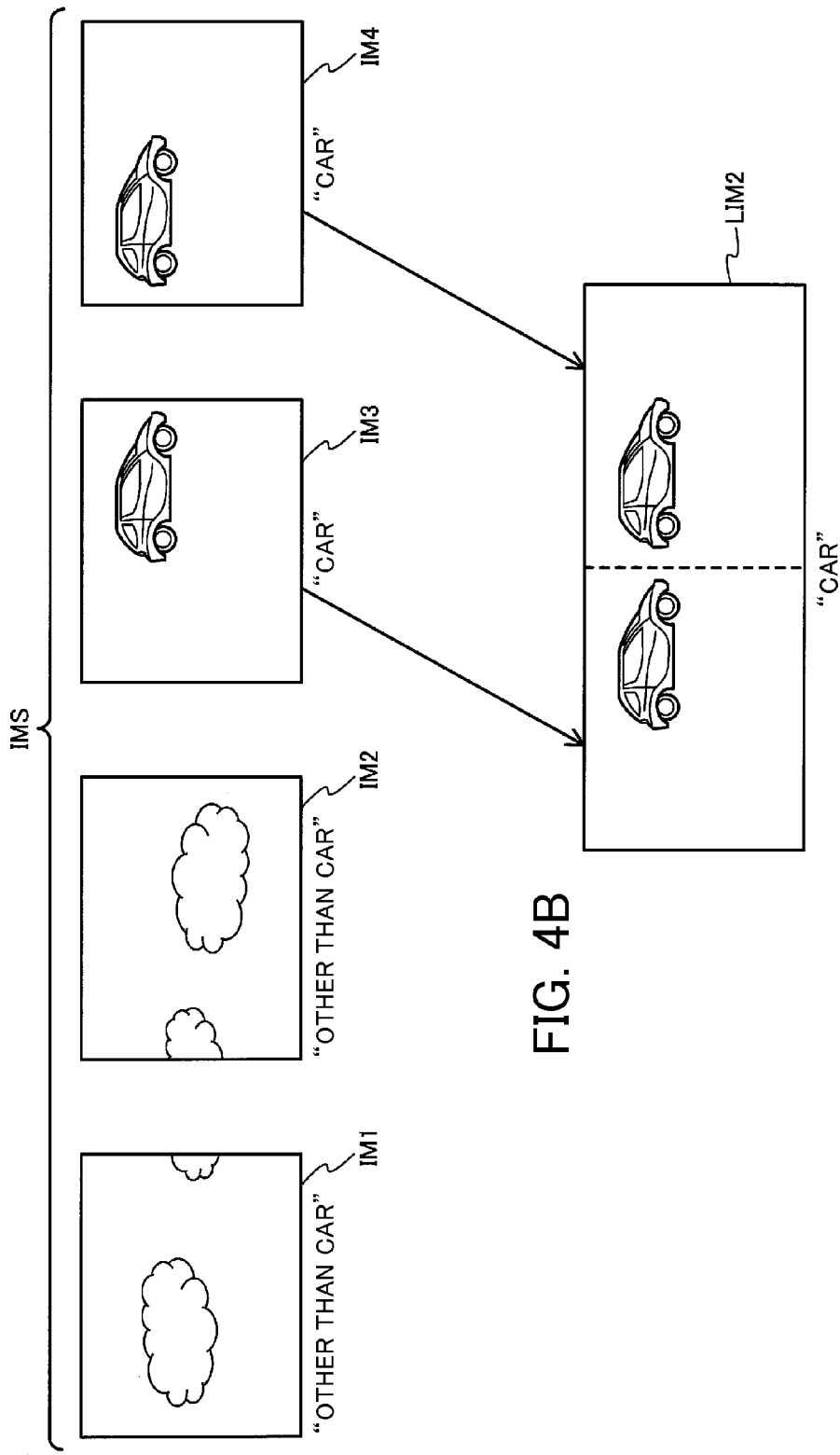

FIG. 6A
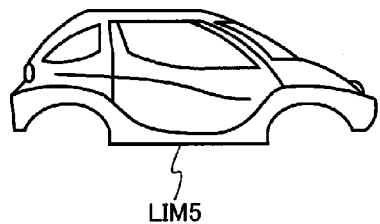
LIM5
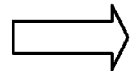
FIG. 6B
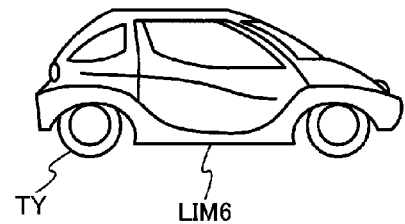
TY  LIM6

FIG. 9A
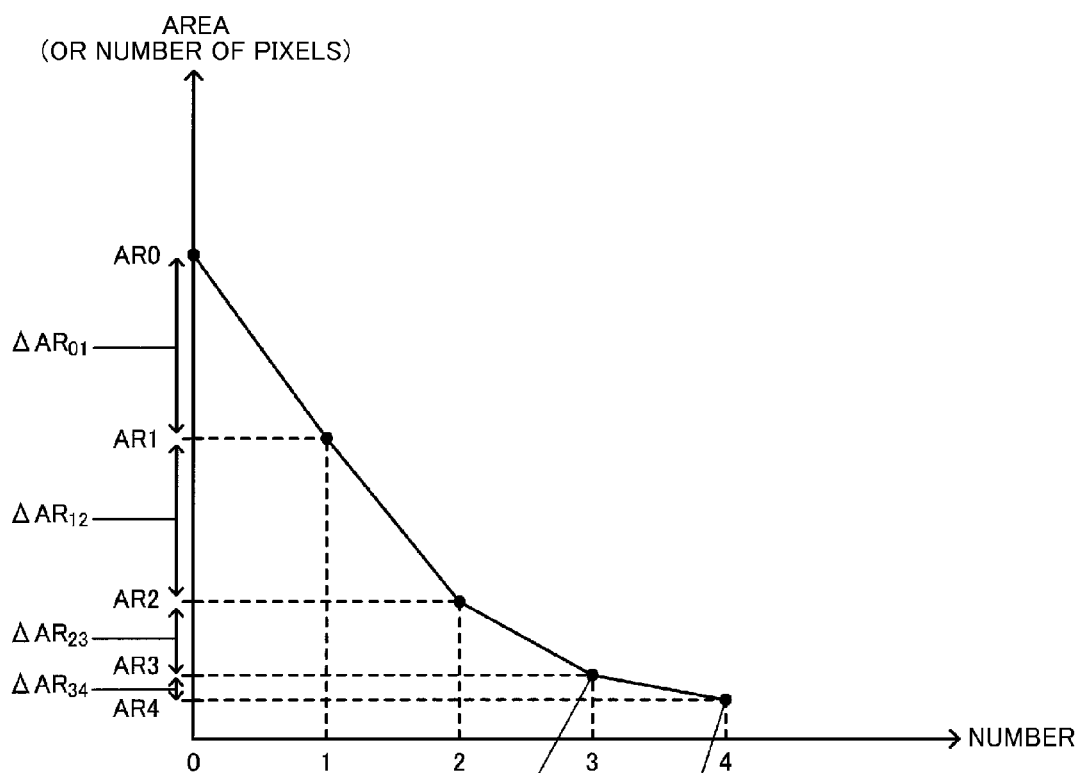
FIG. 9B 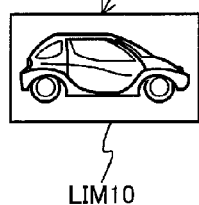 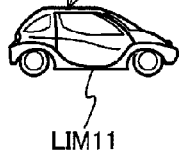 FIG. 9C

IMAGE PROCESSING DEVICE, INFORMATION STORAGE DEVICE, AND IMAGE PROCESSING METHOD

CROSS REFERENCE TO RELATED APPLICATION

This application is a continuation of International Patent Application No. PCT/JP2014/056886, having an international filing date of Mar. 14, 2014, which designated the United States, the entirety of which is incorporated herein by reference. Japanese Patent Application No. 2013-093344 filed on Apr. 26, 2013 is also incorporated herein by reference in its entirety.

BACKGROUND

The present invention relates to an image processing device, an information storage device, an image processing method, and the like.

In recent years, supervised learning has been studied in the field of machine learning. The contents of an image may be discriminated (classified) using a discriminator (classifier) that is generated by performing the learning process when it is desired to detect the position of an object within an image. The above technique may also be applied when it is desired to classify an image that partially includes an object or the like that is represented by the correct answer label. For example, JP-A-2008-282267 discloses a method that classifies such an image based on the feature quantity of part of the target image.

The discrimination accuracy (classification accuracy) achieved using the generated discriminator (classifier) normally increases as the amount of training data (i.e., the number of pieces of training data) used for the learning process increases, and it becomes possible to automatically assign a correct label to unlabeled data.

However, the correct answer label is normally manually assigned to the training data. Therefore, it may be difficult to provide a large amount of training data, or the cost required to generate the training data may increase.

When implementing a learning process that generates a classifier for detecting the position of an object or the like from an image that partially includes a scene or an object that is represented by the correct answer label, it is necessary to provide the position, the shape, and the like of the object within the image as training data. However, it takes time to manually provide information about the position and the shape of the object as compared with a process that assigns an attribute class label to an image. As a result, the number of pieces of training data to be provided decreases, and the performance of the classifier (i.e., learning results) deteriorates.

Semi-supervised learning has been developed from supervised learning. Semi-supervised learning utilizes unlabeled data as the training data in addition to data to which the correct answer label is assigned. Generative learning has been proposed as one type of semi-supervised learning in which image data is mainly used as the learning-discrimination target, and a new image is generated from an image to which the correct answer label is assigned, and used for the learning process.

However, when employing the assumption that, when a new image is generated from an image to which the correct answer label is assigned, the correct answer label assigned to the new image is the same as that assigned to the original image, the image to which the correct answer label is assigned can be changed on condition that the correct answer label does not change when generating a new image, and it is impossible to generate a large number of new images. Therefore, it is impossible to sufficiently increase the number of pieces of training data, and sufficiently improve the discrimination accuracy achieved using the discriminator.

When employing the assumption that the correct answer label may be changed when a new image is generated, a new image may be generated from an image to which the correct answer label is assigned using a method that segments the original image (to which the correct answer label is assigned) into a plurality of images, manually assigns the correct answer label to the generated image group, and uses the resulting image group for the learning process as new training data. In this case, it is possible to sufficiently increase the number of pieces of training data. However, the cost required to label the training data increases to a large extent.

SUMMARY

According to one aspect of the invention, there is provided an image processing device comprising:

an input reception section that performs a process that receives a learning image and a correct answer label assigned to the learning image;

a processing section that performs a process that generates classifier data that is used to classify an image, and a processing target image that is used to generate the classifier data; and a storage section that stores the generated classifier data, the processing section generating the processing target image that is the entirety or part of the learning image, calculating a feature quantity of the processing target image, generating the classifier data based on training data that is a set of the feature quantity and the correct answer label that is assigned to the learning image that corresponds to the feature quantity, generating an image group based on the learning image or the processing target image, classifying each image of the generated image group using the classifier data to calculate a classification score of each image of the image group, and regenerating the processing target image based on the calculated classification score and the image group.

According to one aspect of the invention, there is provided an information storage device storing a program that causes a computer to perform steps of:

performing a process that receives a learning image and a correct answer label assigned to the learning image;

performing a process that generates classifier data that is used to classify an image, and a processing target image that is used to generate the classifier data; and storing the generated classifier data, while generating the processing target image that is the entirety or part of the learning image, calculating a feature quantity of the processing target image, generating the classifier data based on training data that is a set of the feature quantity and the correct answer label that is assigned to the learning image that corresponds to the feature quantity, generating an image group based on the learning image or the processing target image, classifying each image of the generated image group using the classifier data to calculate a classification score of each image of the image group, and regenerating the processing target image based on the calculated classification score and the image group.

According to one aspect of the invention, there is provided an image processing method comprising:

performing a process that receives a learning image and a correct answer label assigned to the learning image;

generating a processing target image that is used to generate classifier data that is used to classify an image, the processing target image being the entirety or part of the learning image;

calculating a feature quantity of the processing target image;

generating the classifier data based on training data that is a set of the feature quantity and the correct answer label that is assigned to the learning image that corresponds to the feature quantity;

generating an image group based on the learning image or the processing target image;

classifying each image of the generated image group using the classifier data to calculate a classification score of each image of the image group;

regenerating the processing target image based on the calculated classification score and the image group; and storing the generated classifier data.

BRIEF DESCRIPTION OF THE DRAWINGS

FIGS. 4A and 4B are views illustrating a process that generates a processing target image from an image group.

FIGS. 6A and 6B are views illustrating an example in which the area of a processing target image increases.

FIGS. 9A to 9C are views illustrating a segmentation size.

DESCRIPTION OF EXEMPLARY EMBODIMENTS

Figure 1:
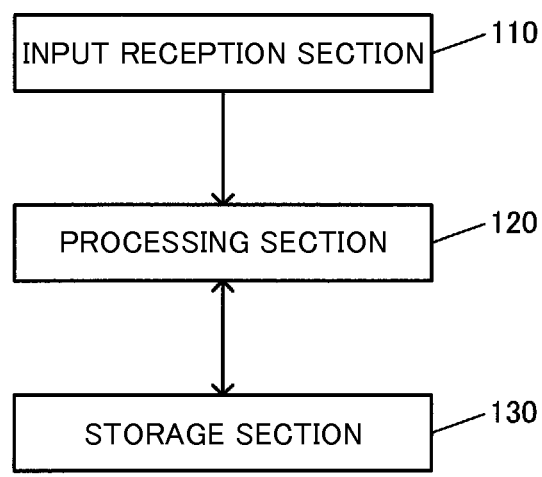
FIG. 1 illustrates a system configuration example according to an embodiment of the invention.

Several embodiments of the invention may provide an image processing device, an information storage device, an image processing method, and the like that make it possible to detect the position of an object by merely labeling a learning image when performing a learning process using a learning image that partially includes an object or the like that is represented by the correct answer label.

Several embodiments of the invention may provide an image processing device, an information storage device, an image processing method, and the like that make it possible to detect the position of an object or the like, and improve the classification accuracy achieved using the resulting classifier by merely labeling a learning image when performing a learning process using a learning image that partially includes an object or the like that is represented by the correct answer label.

According to one embodiment of the invention, a new processing target image is automatically generated by merely assigning the correct answer label to the learning image, and learning is implemented while correcting the training data or increasing the number of pieces of training data.

A new processing target image is generated based on the classification result and the classification score of each image of the image group, and the correct answer label that corresponds to the contents of the processing target image to be generated is automatically assigned. Specifically, it is possible to automatically generate the processing target image that more accurately represents the contents represented by the correct answer label. Therefore, it is possible to reduce the cost required to generate the training data, and use a large amount of training data for learning.

This makes it possible to detect the position of an object within an image by merely labeling the learning image, and improve the classification accuracy achieved using the generated classifier data when performing the learning process using the learning image that partially includes an object or the like represented by the correct answer label.

In the image processing device, the processing section may regenerate the classifier data based on new training data that is a set of the regenerated processing target image and the correct answer label that is assigned to an image selected from the image group when regenerating the processing target image.

This makes it possible to learn an image in which the contents differ from the contents represented by the correct answer label assigned to the original learning image, for example.

In the image processing device, the processing section may compare the classification score of each image of the image group with a given threshold value, may select an image for which the classification score has been calculated to be equal to or higher than the given threshold value from the image group, and may regenerate the processing target image based on a selected image group.

This makes it possible to select images that are likely to include an identical object to generate the processing target image, for example.

In the image processing device, the processing section may change the given threshold value that is compared with the classification score each time the processing target image has been regenerated.

This makes it possible to prevent a situation in which part of the area represented by the correct answer label is deleted from the processing target image, for example.

In the image processing device, the processing section may set the entirety of the learning image to be a first processing target image.

This makes it possible to reduce the cost required to designate an area of the learning image that is used as the processing target image even in an early stage of the learning process, for example.

In the image processing device, the processing section may generate the processing target image that is smaller in number of pixels or area than a preceding processing target image.

This makes it possible to perform the learning process using an image in which the object represented by the correct answer label occupies a large area (ratio) (as a result of removing an area other than the object represented by the correct answer label) as the processing target image, for example.

In the image processing device,
the processing section may generate the image group based on the learning image, and may generate the processing target image that is larger in number of pixels or area than a preceding processing target image.

This makes it possible to regenerate the processing target image that includes an area that was erroneously deleted when generating the preceding processing target image, and perform the learning process, for example.

In the image processing device,
the processing section may repeat the process that generates the classifier data and the processing target image a given number of times.

This makes it possible to perform the process that generates the classifier data and the processing target image a number of times that ensures a given cost efficiency, for example.

In the image processing device,
the processing section may stop repeating the process that generates the classifier data and the processing target image when a difference in area or number of pixels between a preceding processing target image and a current processing target image is less than a given threshold value.

This makes it possible to perform the process that generates the classifier data and the processing target image a number of times that ensures a given cost efficiency, for example.

In the image processing device,
the processing section may segment the learning image or the processing target image into a plurality of areas to generate the image group that is a set of images that respectively correspond to the plurality of areas.

This makes it possible to provide an image used for learning without capturing an image, for example.

In the image processing device,
the processing section may overlap-segment the learning image or the processing target image into a plurality of areas to generate the image group that is a set of images that respectively correspond to the plurality of areas.

This makes it possible to easily generate the processing target image that is more effective for the learning process, for example.

In the image processing device,
the processing section may over-segment the learning image or the processing target image into a plurality of areas to generate the image group that is a set of images that respectively correspond to the plurality of areas.

This makes it possible to more accurately determine the boundary between the object and the background corresponding to contour-color information, for example.

In the image processing device,
the processing section may change a segmentation size of the learning image or the processing target image each time the process that generates the classifier data and the processing target image has been performed.

This makes it possible to generate the processing target image to have a shape along the contour of the object represented by the correct answer label, for example.

In the image processing device,
the processing section may display a processing target image group on a display section, may acquire correction instruction information that instructs to correct the processing target image group, and may perform a correction process on the processing target image group based on the correction instruction information.

This makes it possible to correct a processing target image included in the processing target image that adversely affects the learning results, for example.

In the image processing device,
the processing section may display a list of the processing target image group on the display section, may acquire designation information that designates an unnecessary processing target image from the processing target image group as the correction instruction information, and may delete the processing target image designated by the designation information from the processing target image group.

This makes it possible to suppress a situation in which the learning process is performed using a processing target image that adversely affects the learning results, for example.

In the image processing device,
the processing section may calculate the feature quantity of the processing target image using a bag of features.

This makes it possible to generate the classifier data by which it is possible to accurately classify an image that includes another object that is identical in type as the object included in the learning image, and an image that differ in the angle of the object from the learning image, for example.

In the image processing device,
the processing section may perform an object detection process based on the classification score of each image of the image group.

This makes it possible to accurately detect the position of an object or the like (within the original learning image) that is represented by the correct answer label by repeating the process that generates the classifier data, for example.

Exemplary embodiments of the invention are described below. An outline of the embodiments of the invention is described first, and a system configuration example will then be described. The details of the process according to the embodiments of the invention will then be described using a flowchart and the like. The method according to the embodiments of the invention will be summarized thereafter. Note that the following exemplary embodiments do not in any way limit the scope of the invention laid out in the claims. Note also that all of the elements described in connection with the following exemplary embodiments should not necessarily be taken as essential elements of the invention.

1. Outline

In recent years, supervised learning has been studied in the field of machine learning. The term "supervised learning" used herein refers to a method that performs a learning process using data to which the correct answer label is assigned to generate a discriminator (classifier). After completion of the learning process, the contents of unlabeled data to which the correct answer label is not assigned are discriminated using the generated discriminator to label the unlabeled data. Such supervised learning has been used for a search engine, a log analysis system, and the like for which it is necessary to automatically discriminate the contents of a large amount of data.

The contents of an image may be classified using the classifier generated as described above when it is desired to detect the position of an object within an image. An image that partially includes the detection target object or the like may be classified using the classifier. The position of an object within an image may be detected, or the contents of an image may be classified using the method disclosed in JP-A-2008-282267, for example. In such a case, it is necessary to provide data that represents the position, the shape, and the like of an object or the like (within an image) that is represented by the correct answer label as training data in order to perform the learning process using an image that partially includes an object or the like.

However, it takes time to manually provide information about the position and the shape of an object as compared with a process that assigns an attribute class label to an image. As a result, only a limited number of pieces of training data can be provided, and the performance of the classifier (i.e., learning results) deteriorates.

The discrimination accuracy (classification accuracy) achieved using the resulting discriminator normally increases as the amount of training data used for the learning process increases, and it becomes possible to automatically assign the correct label to unlabeled data. However, since the correct answer label is normally manually assigned to the training data, it may be difficult to provide a large amount of training data, or the cost required to generate the training data may increase.

Semi-supervised learning has been developed from supervised learning. Semi-supervised learning utilizes unlabeled data as the training data in addition to data to which the correct answer label is assigned. Generative learning has been proposed as one type of semi-supervised learning in which image data is mainly used as the learning-discrimination target, and a new image is generated from an image to which the correct answer label is assigned, and used for the learning process.

Known generative learning is designed on the assumption that, when a new image is generated from an image to which the correct answer label is assigned, the correct answer label assigned to the new image is the same as that assigned to the original image.

For example, when generating a new image by performing image processing on an image to which the correct answer label is assigned, small noise may be added to the image to which the correct answer label is assigned, or the brightness of the image to which the correct answer label is assigned may be slightly changed, for example.

However, it is normally difficult to determine the degree by which the brightness or the like of the image can be changed while ensuring that the correct answer label assigned to the new image is the same as that assigned to the original image. Specifically, when employing the assumption that, when a new image is generated from an image to which a correct answer label is assigned, the correct answer label assigned to the new image is the same as that assigned to the original image, the image to which the correct answer label is assigned can be changed on condition that the correct answer label does not change when generating a new image, and it is impossible to generate a large number of new images. Therefore, it is impossible to sufficiently increase the number of pieces of training data, and sufficiently improve the discrimination accuracy achieved using the discriminator.

When employing the assumption that the correct answer label may be changed when a new image is generated, a new image may be generated from an image to which the correct answer label is assigned using a method that segments the original image (to which the correct answer label is assigned) into a plurality of images, for example.

However, when the original image (to which the correct answer label is assigned) is segmented into a plurality of images, the correct answer label assigned to the generated image is not necessarily the same as the correct answer label assigned to the original image. For example, when the original image includes a flower and the sky, and the correct answer label "flower" is assigned to the original image, an image that includes only a flower, an image that includes only the sky, and the like may be generated as a result of segmenting the original image (to which the correct answer label is assigned), and it is rare that the correct answer label "flower" is assigned to each of the generated images. Therefore, the generated images (unlabeled images) cannot be used directly for the learning process.

In order to deal with the above problem, the correct answer label may be manually assigned to an image group generated by segmenting an image to which the correct answer label is assigned, and the image group may be used for the learning process as new training data. In this case, it is possible to sufficiently increase the number of pieces of training data. However, the cost required to label the training data increases to a large extent.

The embodiments of the invention propose an image processing device, an information storage device, an image processing method, and the like that make it possible to detect the position of an object or the like, and improve the classification accuracy achieved using the resulting classifier by merely labeling a learning image when performing a learning process using a learning image that partially includes an object or the like that is represented by the correct answer label.

2. System Configuration Example

FIG. 1 illustrates a configuration example of an image processing device according to one embodiment of the invention.

The image processing device includes an input reception section 110, a processing section 120, and a storage section 130. The input reception section 110 is connected to the processing section 120, and the processing section 120 is bidirectionally connected to the storage section 130. Note that the configuration of the image processing device is not limited to the configuration illustrated in FIG. 1. Various modifications may be made, such as omitting some of the elements illustrated in FIG. 1, or adding other elements. Some or all of the functions of the image processing device may be implemented by a server that is connected to a network, or may be implemented by a terminal device that includes a display section and the like.

The process performed by each section is described below.

The input reception section 110 performs a process that receives a learning image and a correct answer label assigned to the learning image. The input reception section 110 may be a communication section that communicates with an external server or an external storage section through a network that includes at least one of a cable network and a wireless network, or may be an interface that allows the user to input the correct answer label and the like, and includes a keyboard, a mouse, and the like.

The processing section 120 performs a process that generates classifier data that is used to classify an image, and the processing target image that is used to generate the classifier data. The function of the processing section 120 may be implemented by hardware such as a processor (e.g., CPU) or an ASIC (e.g., gate array), a program, or the like. The details of the process performed by the processing section 120 are described later.

The storage section 130 stores the generated classifier data and the like, and serves as a work area for the processing section 120 and the like. The function of the storage section 130 may be implemented by a memory (e.g., RAM), an HDD, or the like.

3. Details of Process

Figure 2:
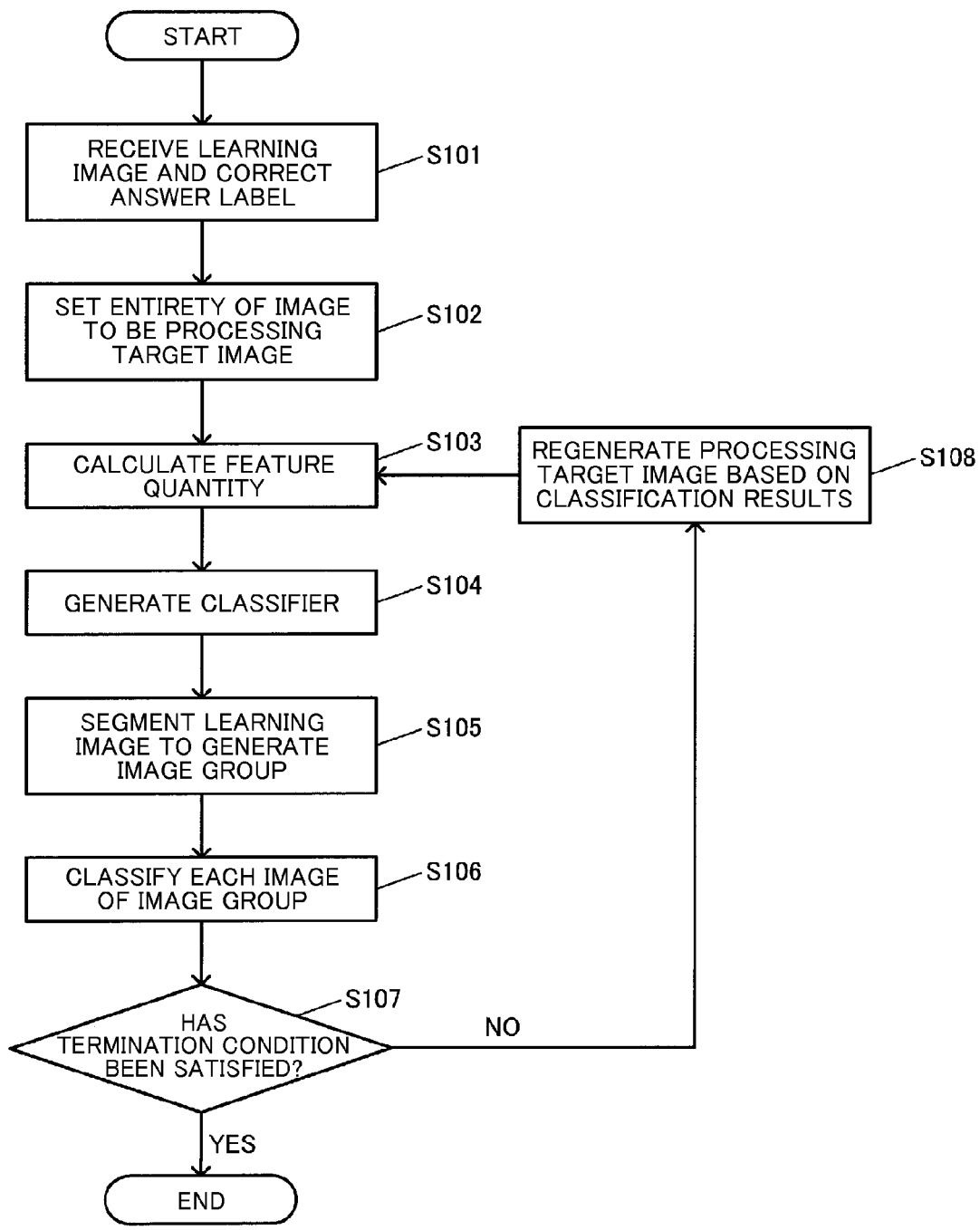
FIG. 2 is a flowchart illustrating the flow of a process according to one embodiment of the invention.

The flow of the process according to one embodiment of the invention is described below using the flowchart illustrated in FIG. 2.

The input reception section 110 receives a learning image group used for the learning process, and an attribute class label (correct answer label) that is assigned to each learning image (S101).

The processing section 120 sets the entirety of each learning image to be the processing target image (S102). It is unnecessary to assign information about the position and the shape of the detection target within each learning image by setting the entirety of the learning image to be the first processing target image.

The processing section 120 calculates the feature quantity of each processing target image (S103). Note that the feature quantity is calculated using a bag of features (BoF). When the processing target image has a different size, it is necessary to normalize the frequency of the BoF histogram corresponding to the size of the processing target image.

The processing section 120 performs a learning process using a set of the calculated feature quantity and the attribute class as training data to generate classifier data (S104). A support vector machine (SVM) is used to generate the classifier data. Note that another supervised learner such as kernel discriminant analysis (KDA) may also be used.

The processing section 120 then segments (overlap-segments or over-segments) each learning image to generate an image group (S105). In one embodiment of the invention, the learning image is segmented into a plurality of blocks that may overlap each other to generate an image group that is a set of these images. Note that the image may be over-segmented using a JSEG segmentation method or the like. In this case, it is possible to determine a more accurate boundary between the detection target area and the background corresponding to contour-color information.

The processing section 120 then classifies each image of the generated image group using the classifier data to calculate the classification score (S106).

The processing section 120 then determines whether or not a termination condition has been satisfied (S107). When it has been determined that the termination condition has been satisfied, the processing section 120 terminates the process.

When it has been determined that the termination condition has not been satisfied, the processing section 120 generates the sum of the images of the generated image group for which the classification score is higher than a given threshold value to be a new processing target image (S108). The processing section 120 performs the steps S103 to S108 until the termination condition is satisfied.

4. Method

The method according to one embodiment of the invention is described below.

The image processing device according to one embodiment of the invention includes the input reception section 110 that performs the process that receives the learning image and the correct answer label assigned to the learning image, the processing section 120 that performs the process that generates the classifier data that is used to classify an image, and the processing target image that is used to generate the classifier data, and the storage section 130 that stores the generated classifier data. The processing section 120 generates the processing target image that is the entirety or part of the learning image. The processing section 120 calculates the feature quantity of the processing target image, and generates the classifier data based on the training data that is a set of the feature quantity and the correct answer label that is assigned to the learning image that corresponds to the feature quantity. The processing section 120 generates an image group based on the learning image or the processing target image, classifies each image of the generated image group using the classifier data to calculate the classification score of each image, and regenerates the processing target image based on the calculated classification score and the image group.

The term "learning image" used herein refers to an image that is used for the learning process. For example, the term "learning image" used herein refers to the original image of the processing target image and the image group (described later). The learning image may be an image to which the correct answer label is assigned in advance, or may be an image to which the correct answer label is not assigned.

The term "label (class)" used herein refers to a word, a symbol, and the like that represent the contents of data (image data). The term "correct answer label" used herein refers to a label that accurately (correctly) represents the contents of data. Specifically, the correct answer label is a label that corresponds to the class (attribute class) to which data is attributed. For example, when two labels "car" and "other than car" are provided, and an image is classified based on whether or not a car is included in the image, the label "car" is the correct answer label assigned to the learning image LIM1 illustrated in FIG. 3 that includes two cars and the sky (clouds).

The term "classifier (discriminator, learning discriminator, classification model, or discrimination model)" used herein refers to a standard, a rule, and the like that are used to determine the label that should be assigned to test data. For example, the classifier is the learning results (classifier data) obtained by performing the learning process using the learning algorithm (e.g., support vector machine (SVM)) and the training data.

The term "processing target image" used herein refers to an image that is used directly to generate the classifier data, and refers to the entirety or part of the learning image. A specific processing target image generation method is described in detail later.

The term "training data" used herein refers to data that is input directly to the learning algorithm. For example, the training data is a set of the feature quantity of the processing target image and the correct answer label that is assigned to the learning image that corresponds to the feature quantity. Note that the learning image that corresponds to the feature quantity refers to the original learning image of the processing target image that has the feature quantity. A set of the processing target image and the correct answer label that is assigned to the original learning image of the processing target image is used as the first training data. Note that the training data is not limited thereto. For example, a correct answer label that differs from the correct answer label assigned to the original learning image may be used depending on the processing target image.

Figure 3:
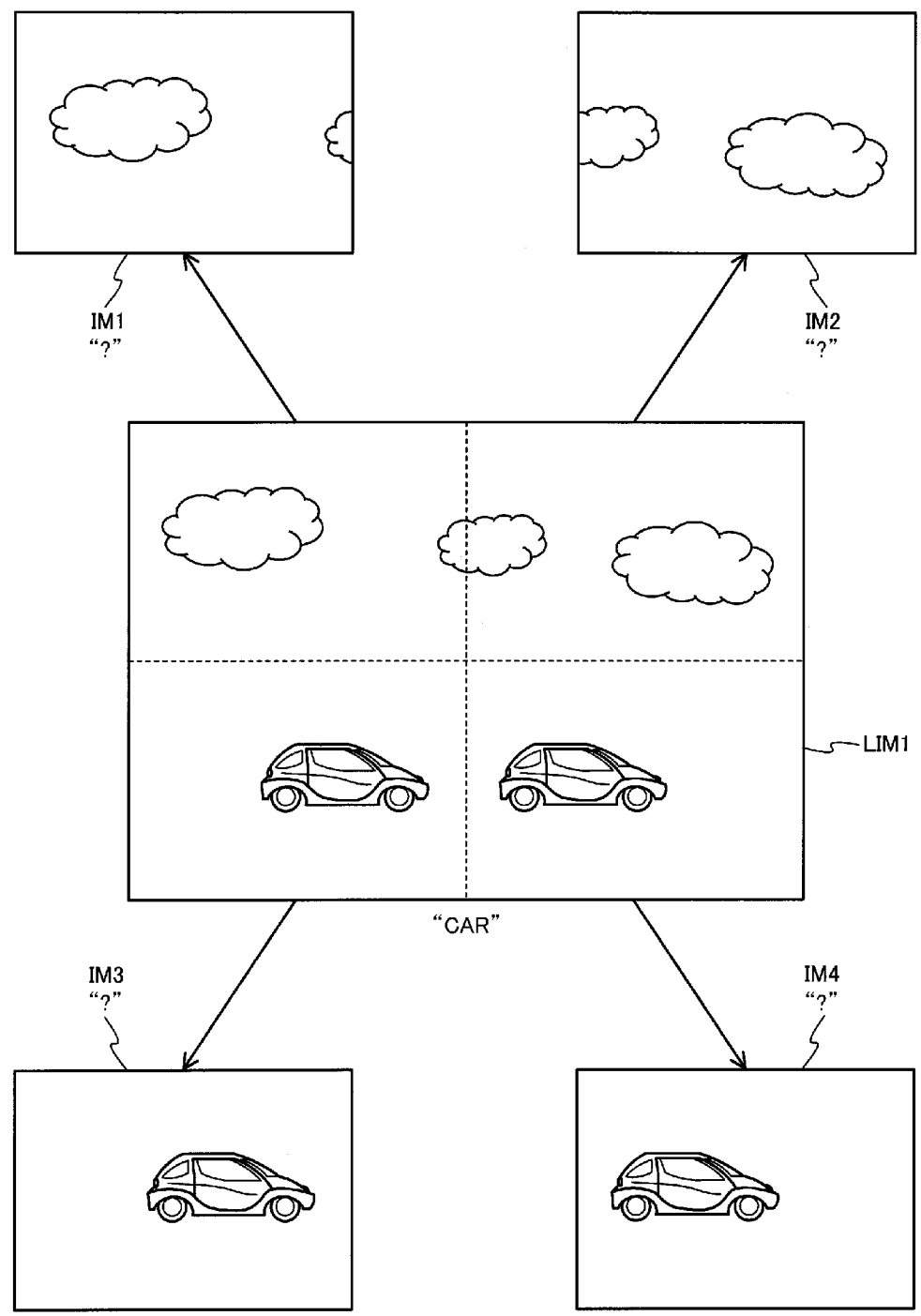
FIG. 3 is a view illustrating a process that generates an image group from a learning image or a processing target image.

The image group that is generated from the learning image or the processing target image is a set of images used to regenerate the processing target image. In FIG. 3, four images IM1 to IM4 (image group) are generated from the learning image LIM1. As illustrated in FIG. 3, the images IM1 to IM4 differ in contents from each other, and the correct answer label assigned to each image of the image group is not necessarily the same as the correct answer label assigned to the learning image LIM1. Therefore, the correct answer label has not been assigned to each image of the image group immediately after generation, and each image is labeled using the classifier data. The number of images included in the image group is not limited to four (see FIG. 3). An arbitrary number of images may be included in the image group.

The term "classification score (discrimination score)" used herein refers to the degree of likelihood of the classification result (discrimination result). For example, the classification score is the distance from the classification boundary when using the SVM as the classification method (discrimination method), and is the difference in (Mahalanobis) distance from the cluster center when using a discriminant analysis method. The classification score is the likelihood when using a statistical (Bayesian) discriminator as the classification method, and is the sum of the weighted votes of weak classifiers when using boosting.

This makes it possible to automatically generate a new processing target image by merely assigning the correct answer label to the learning image, and implement the learning process while correcting the training data or increasing the number of pieces of training data.

Since a new processing target image is generated based on the classification result and the classification score of each image of the image group, it is possible to automatically assign the correct answer label that corresponds to the contents of the processing target image to be generated.

The same correct answer label as that of the original learning image is basically assigned to the processing target image to be generated. Note that the configuration is not limited thereto.

Specifically, the processing section 120 may regenerate the classifier data based on new training data that is a set of the regenerated processing target image and the correct answer label that is assigned to the image selected from the image group when regenerating the processing target image.

A specific example of the above process is described below with reference to FIGS. 4A and 4B. The images IM1 to IM4 of the image group generated from the learning image LIM1 illustrated in FIG. 3 are classified based on the classifier data. As a result, the label "other than car" is assigned to the images IM1 and IM2, and the label "car" is assigned to the images IM3 and IM4 (see FIG. 4A).

When the images IM3 and IM4 to which the label "car" is assigned are combined to generate the processing target image LIM2 illustrated in FIG. 4B, the label "car" is assigned to the processing target image LIM2.

On the other hand, the label "other than car" is assigned to the processing target image generated using the images IM1 and IM2 to which the label "other than car" is assigned. Specifically, the correct answer label that represents the contents of the processing target image is automatically assigned to the processing target image.

This makes it possible to reduce the cost required to manually label each image of the generated image group and the processing target image. It is also possible to reduce the cost required to designate the position within the learning image where the object or the like that is represented by the correct answer label is situated, for example. This makes it possible to provide a large amount of training data, and improve the classification accuracy achieved using the classifier data.

Specifically, it is possible to detect the position of an object or the like within an image by merely labeling the learning image, and improve the classification accuracy achieved using the classifier data when performing the learning process using the learning image that partially includes an object or the like that is represented by the correct answer label, for example.

It is also possible to add an image having contents that differ from the contents represented by the correct answer label (assigned to the original learning image) to the training data, and perform the learning process by automatically labeling the regenerated processing target image to generate new training data, and utilizing the new training data for the learning process, for example.

For example, it is possible to add an image that represents a car and an image to which the label "other than car" is assigned to the training data, and perform the learning process. This makes it possible to more accurately classify an image that includes an object other than a car, and improve the classification accuracy with regard to a car, for example.

It is desirable that the images (selected images) used to generate the processing target image include an identical object. It is determined that the classification result obtained using the classifier data is likely to be correct as the classification score increases. Specifically, it is likely that an identical object is included in images for which the classification result is identical and the classification score is high.

Therefore, the processing section 120 may compare the classification score of each image of the image group with a given threshold value, select an image for which the classification score has been calculated to be equal to or higher than the given threshold value from the image group, and regenerate the processing target image based on the selected image group.

For example, when generating the processing target image LIM2 illustrated in FIG. 4B, the images IM3 and IM4 illustrated in FIG. 4A are selected. Note that the number of images to be selected is not particularly limited, and the processing target image need not necessarily be generated by combining a plurality of selected images (see FIG. 4B).

This makes it possible to select images that are likely to include an identical object to generate the processing target image, for example.

The processing section 120 may set the entirety of the learning image to be the first processing target image.

This makes it possible to reduce the cost required to designate an area of the learning image that is used as the processing target image even in an early stage of the learning process, for example.

The processing section 120 may generate the processing target image that is smaller in number of pixels or area than the preceding processing target image.

Figure 5A:
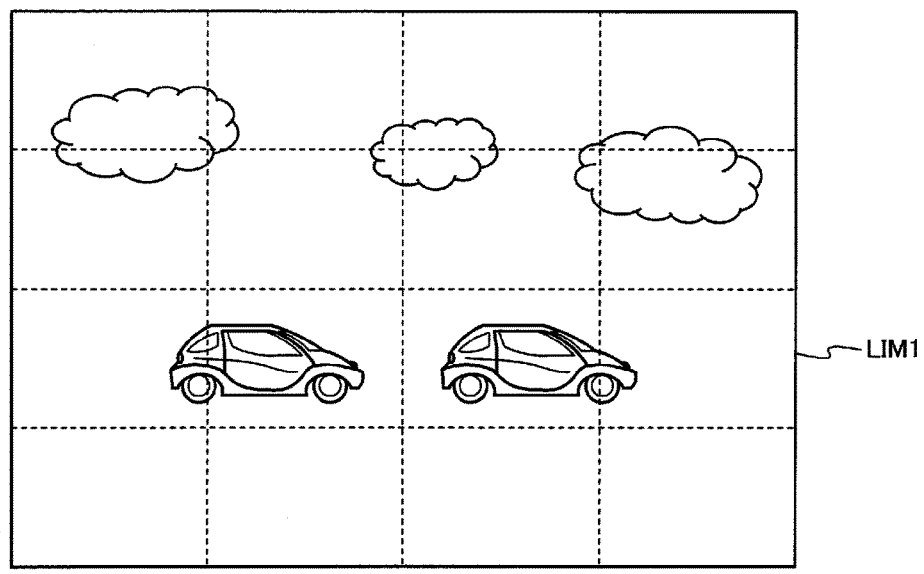
FIGS. 5A to 5C are views illustrating a processing target image generated by a process that generates a processing target image.
Figure 5B:
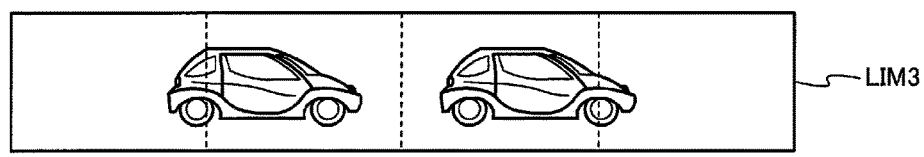
Figure 5C:

FIGS. 5A to 5C illustrate a specific example. As illustrated in FIG. 5A, the learning image LIM1 is segmented into a plurality of areas indicated by the dotted lines. The selected images are selected from the images (image group) that respectively correspond to the plurality of areas, and combined to generate the processing target image LIM3 illustrated in FIG. 5B. When the entirety of the learning image LIM1 is used as the first processing target image, the processing target image LIM3 is smaller in number of pixels or area than the first processing target image since the areas other than the areas that include the cars are removed. The processing target image LIM4 illustrated in FIG. 5C can be generated by performing the process while reducing the segmentation size (as described later). The processing target image LIM4 is an image obtained by trimming the learning image along the contour of the car, and is smaller in number of pixels or area than the processing target image LIM3.

This makes it possible to perform the learning process using an image in which the object represented by the correct answer label occupies a large area (ratio) (as a result of removing an area other than the object (contents) represented by the correct answer label) as the processing target image, for example. Therefore, it is possible for the learning process to accurately learn the object represented by the correct answer label in the same manner as in the case of designating an area of the original learning image that includes the object represented by the correct answer label, for example.

The processing section 120 may generate the image group based on the learning image, and generate the processing target image that is larger in number of pixels or area than the preceding processing target image.

When generating the image group from the processing target image, the number of pixels or the area of the processing target image to be generated gradually decreases (or does not change). However, the number of pixels or the area of the processing target image may increase when generating the image group from the original learning image.

FIGS. 6A and 6B illustrate a specific example. The processing target image LIM5 illustrated in FIG. 6A is an image of a car in which the tires are removed. Specifically, the tires were removed when generating the processing target image since the images of the tires were determined to be other than a car, or the classification score was lower than a given threshold value although the images of the tires were determined to be a car.

In this case, the processing target image LIM6 illustrated in FIG. 6B in which the tires TY are recovered can be generated by generating the image group from the original learning image when the classification accuracy achieved using the classification model has been improved by repeated learning.

This makes it possible to regenerate the processing target image that includes an area that was erroneously deleted when generating the preceding processing target image, and perform the learning process, for example.

The processing target image in which part of the area represented by the correct answer label is deleted (see FIG. 6A) may be generated when the classification score threshold value for selecting an image is set to be large even though learning has not sufficiently advanced, and the classification accuracy achieved using the classifier data is low.

Therefore, the processing section 120 may change the given threshold value that is compared with the classification score each time the processing target image has been regenerated.

FIGS. 7A to 7D illustrate a specific example. In the example illustrated in FIGS. 7A to 7D, the process that generates the classifier data and the processing target image is performed four times.

Figure 7A:
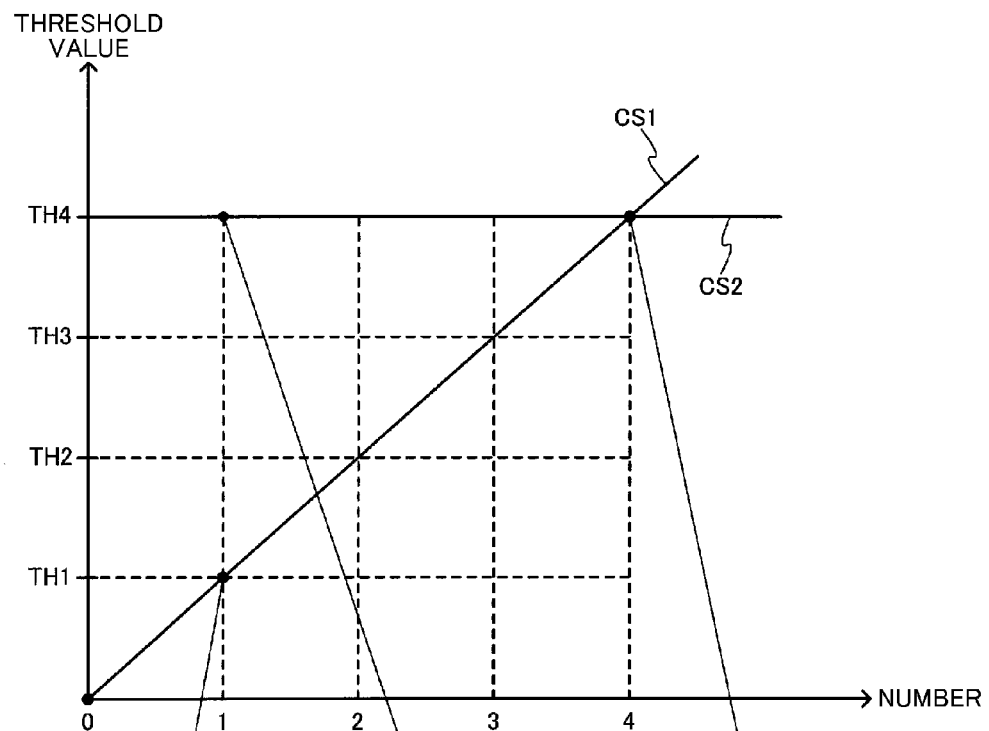
FIGS. 7A to 7D are views illustrating a classification score threshold value.
Figure 7B:
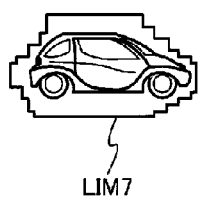
Figure 7C:
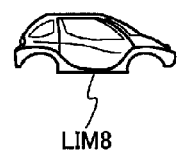
Figure 7D:
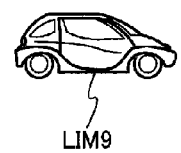

FIG. 7A illustrates a graph that represents the relationship between the number of times that the process that generates the classifier data and the processing target image has been performed (horizontal axis), and the threshold value (vertical axis). FIG. 7A illustrates a change in the threshold value corresponding to Case 1 (CS1) and Case 2 (CS2). In Case 1, the threshold value is increased, and the segmentation size of the learning image is decreased (as described later) along with an increase in the number of times that the process that generates the classifier data and the processing target image has been performed (see the straight line CS1). In Case 2, the threshold value is fixed at TH4, and the segmentation size of the learning image is fixed at the minimum value (see the straight line CS2).

In Case 1, the processing target image LIM7 (that is not formed along the contour of the car, and includes an area other than the car) is generated when the process that generates the classifier data and the processing target image has been performed for the first time since the threshold value TH1 is used, and the segmentation size is large. The processing target image LIM7 includes an area other than the car since the threshold value is small, and an image for which the classification score is low is also used to generate the processing target image.

In Case 2, the processing target image LIM8 (that is formed along the contour of the car) is generated when the process that generates the classifier data and the processing target image has been performed for the first time since the threshold value TH4 is used, and the segmentation size is a minimum. However, the tires are removed in the processing target image LIM8. If it is not learnt that the tires are part of the car based on another piece of training data, it is not likely that the tires are recovered even when the process that generates the classifier data and the processing target image has been performed for the fourth time.

In Case 1, since the threshold value TH4 is used when learning has sufficiently advanced, the processing target image LIM9 that is formed along the contour of the car (in which the tires are not removed) can be generated.

This makes it possible to prevent a situation in which part of the area represented by the correct answer label is deleted from the processing target image, for example. Since a different processing target image is generated each time the process that generates the classifier data and the processing target image is performed, it is possible to implement the learning process using a larger number of types of training data, and improve the classification accuracy, for example.

The processing section 120 may calculate the feature quantity of the processing target image using a bag of features.

Note that the term "bag of features (bag of visual words (BoVW))" refers to an image representation method that considers an image to be a set of local features.

This makes it possible to generate the classifier data by which it is possible to accurately classify an image that includes another object that is identical in type as the object included in the learning image, and an image that differs in the (display) angle of the object from the learning image, for example.

A value used as the feature quantity (local feature quantity) of the image (pixel) may be a color feature quantity (e.g., hue, saturation, and value (HSV)), or may be a gradient feature quantity (e.g., scale-invariant feature transform (SIFT) and histograms of oriented gradients (HOG)), or may be a texture feature quantity (e.g., local binary pattern (LBP)). Note that camera setting information (e.g., imaging conditions and focal distance) may also be used as the feature quantity.

The processing section 120 may segment the learning image or the processing target image into a plurality of areas to generate the image group that is a set of the images that respectively correspond to the plurality of areas (see FIG. 3).

This makes it possible to provide an image used for the learning process without capturing an additional image, for example.

The processing section 120 may overlap-segment the learning image or the processing target image into a plurality of areas to generate the image group that is a set of the images that respectively correspond to the plurality of areas.

Figure 8A:
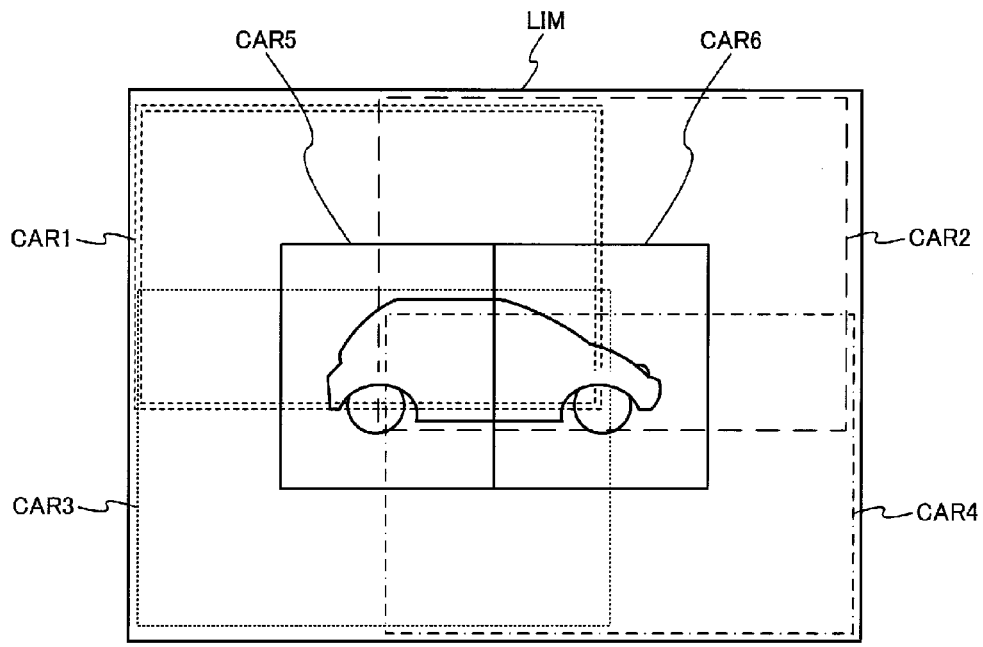
FIGS. 8A and 8B are views illustrating a process that generates an image group.

For example, the learning image LIM (or the processing target image) is segmented into areas CAR1 to CAR6 that overlap each other as illustrated in FIG. 8A to generate the image group. In this case, a small area (CAR5, CAR6) may be set over a large area (CAR1 to CAR4). The image that corresponds to the area CAR5 and the image that corresponds to the area CAR6 are used when generating the processing target image that includes the car.

This makes it possible to easily generate the processing target image that is more effective for the learning process, for example.

The processing section 120 may over-segment the learning image or the processing target image into a plurality of areas to generate the image group that is a set of the images that respectively correspond to the plurality of areas.

The term "over-segmentation" used herein refers to segmenting an image into a plurality of areas at the boundary between objects and within each object.

Figure 8B:
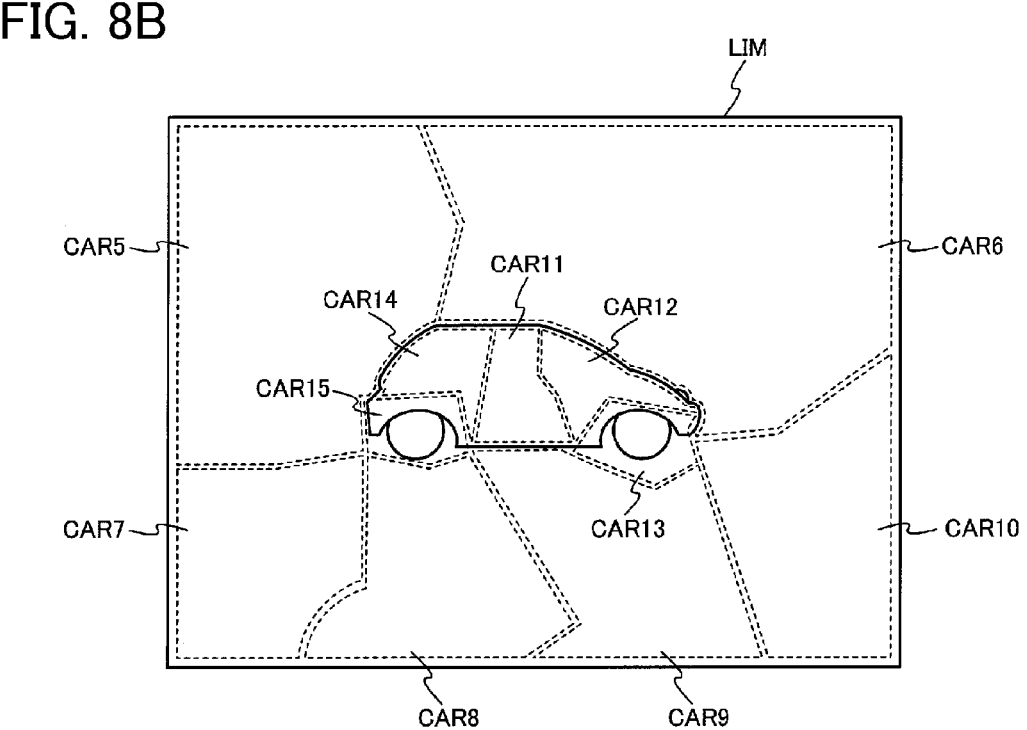

For example, the learning image LIM (or the processing target image) is segmented into areas CAR5 to CAR15 as illustrated in FIG. 8B to generate the image group. In the example illustrated in FIG. 8B, the car is segmented into the areas CAR11 to CAR15.

This makes it possible to more accurately determine the boundary between the object and the background corresponding to contour-color information, for example.

The processing section 120 may change the segmentation size of the learning image or the processing target image each time the process that generates the classifier data and the processing target image has been performed.

This makes it possible to generate the processing target image to have a shape along the contour of the object represented by the correct answer label, for example. Specifically, it is possible to generate the processing target image that more accurately represents the shape of the object, for example.

It is considered that the classification accuracy achieved using the generated classifier data is improved as the process that generates the classifier data is repeated a larger number of times. It is considered that an improvement in classification accuracy gradually decreases as the classifier data is generated after the process that generates the classifier data has been repeated a given number of times. In this case, an improvement in classification accuracy with respect to an identical learning time decreases as the process that generates the classifier data is repeated a larger number of times. Specifically, the cost efficiency of the process that generates the classifier data deteriorates as the process that generates the classifier data is repeated a larger number of times.

Therefore, the processing section 120 may repeat the process that generates the classifier data and the processing target image a given number of times.

This makes it possible to perform the process that generates the classifier data and the processing target image a number of times that ensures a given cost efficiency, for example.

An improvement in classification accuracy achieved using the classifier data decreases since the processing target image used for learning differs to only a small extent from the preceding processing target image as the process that generates the classifier data and the processing target image is repeated a larger number of times.

Therefore, the processing section 120 may stop repeating the process that generates the classifier data and the processing target image when the difference in area or number of pixels between the preceding processing target image and the current processing target image is less than a given threshold value.

A specific example is described below with reference to FIGS. 9A to 9C. FIG. 9A illustrates a graph that represents the relationship between the number of times that the process that generates the classifier data and the processing target image has been performed (horizontal axis), and the area or the number of pixels of the generated processing target image (vertical axis). In the graph illustrated in FIG. 9A, the area of the processing target image generated when the process that generates the classifier data and the processing target image has been performed for the first time is AR1, the area of the processing target image generated when the process that generates the classifier data and the processing target image has been performed for the second time is AR2, and the area of the processing target image generated when the process that generates the classifier data and the processing target image has been performed for the third time is AR3. The area AR0 when the process that generates the classifier data and the processing target image has not been performed represents the area of the learning image. The difference in area (or number of pixels) between the learning image and the processing target image generated when the process that generates the classifier data and the processing target image has been performed for the first time is $\Delta AR_{01}$, the difference in area (or number of pixels) between the processing target image generated when the process that generates the classifier data and the processing target image has been performed for the first time and the processing target image generated when the process that generates the classifier data and the processing target image has been performed for the second time is $\Delta AR_{12}$, the difference in area (or number of pixels) between the processing target image generated when the process that generates the classifier data and the processing target image has been performed for the second time and the processing target image generated when the process that generates the classifier data and the processing target image has been performed for the third time is $\Delta AR_{23}$, and the difference in area (or number of pixels) between the processing target image generated when the process that generates the classifier data and the processing target image has been performed for the third time and the processing target image generated when the process that generates the classifier data and the processing target image has been performed for the fourth time is $\Delta AR_{34}$.

When the given threshold value TH is set to satisfy $\Delta AR_{23}<TH<\Delta AR_{34}$, the process that generates the classifier data and the processing target image is terminated when the process that generates the classifier data and the processing target image has been performed for the fourth time, since the difference $\Delta AR_{34}$ in area between the processing target image LIM10 (see FIG. 9B) generated when the process that generates the classifier data and the processing target image has been performed for the third time and the processing target image LIM11 (see FIG. 9C) generated when the process that generates the classifier data and the processing target image has been performed for the fourth time exceeds the given threshold value TH.

This makes it possible to perform the process that generates the classifier data and the processing target image a number of times that ensures a given cost efficiency, for example. It is also possible to determine the termination condition independently of the learning image group as compared with the case of directly designating the repeat count, for example.

The processing section 120 may display a processing target image group on a display section, acquire correction instruction information that instructs to correct the processing target image group, and perform a correction process on the processing target image group based on the correction instruction information.

The term "correction instruction information" used herein refers to information that instructs the details of the correction process performed on the processing target image group, and is input by the user.

This makes it possible to correct a processing target image included in the processing target image that adversely affects the learning results, for example.

More specifically, the processing section 120 may display a list of the processing target image group on the display section, acquire designation information that designates an unnecessary processing target image from the processing target image group as the correction instruction information, and delete the processing target image designated by the designation information from the processing target image group.

The flow of this process is described below using the flowchart illustrated in FIG. 10. The same steps as those of the flowchart illustrated in FIG. 2 are the same as described above with reference to FIG. 2, and description thereof is omitted. The following description focuses on the difference from the flowchart illustrated in FIG. 2.

Figure 10:
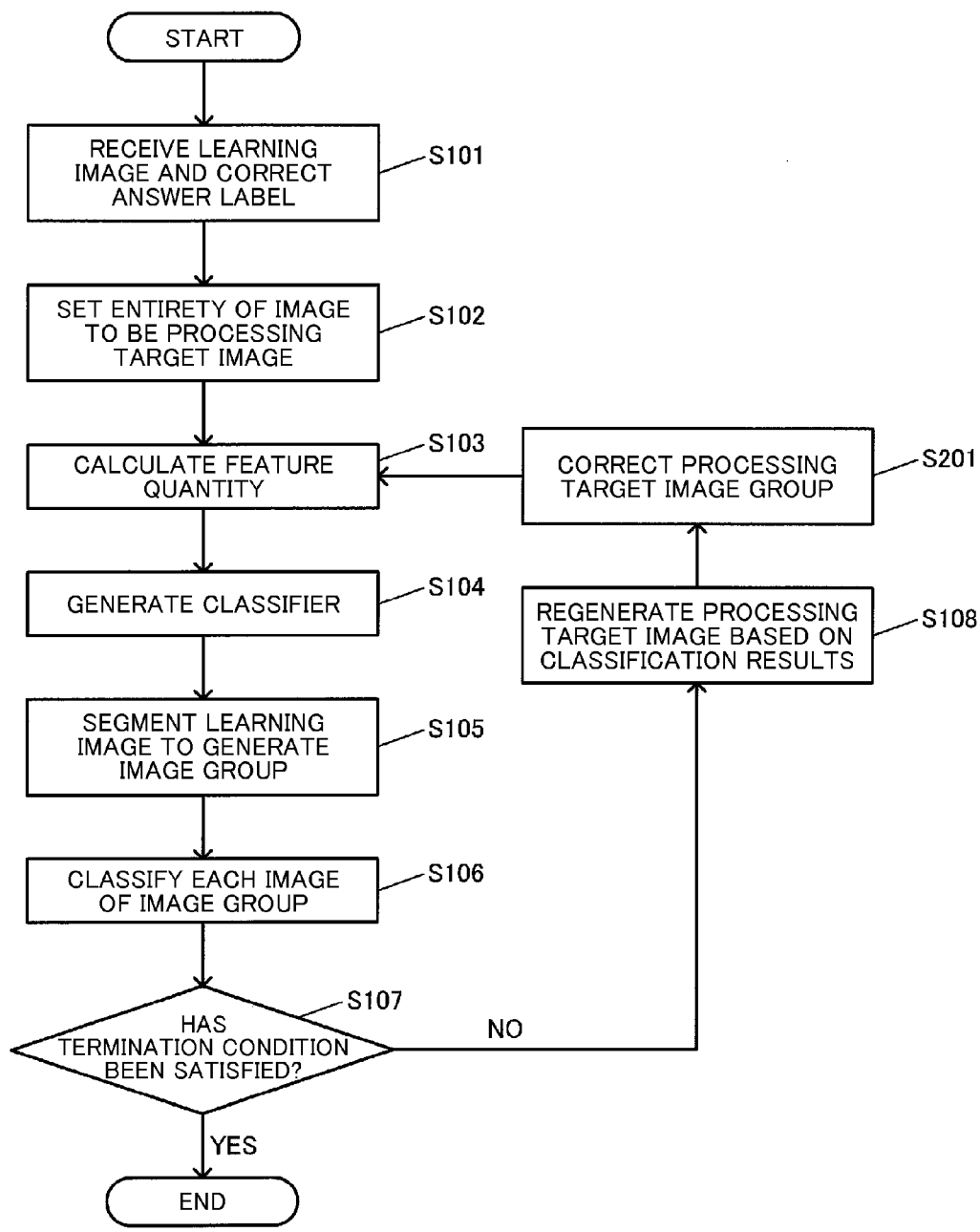
FIG. 10 is a flowchart illustrating the flow of a process when correcting a processing target image group.

As illustrated in FIG. 10, the processing section 120 performs the correction process on the processing target image group after the step S108 (S201).

Figure 11:
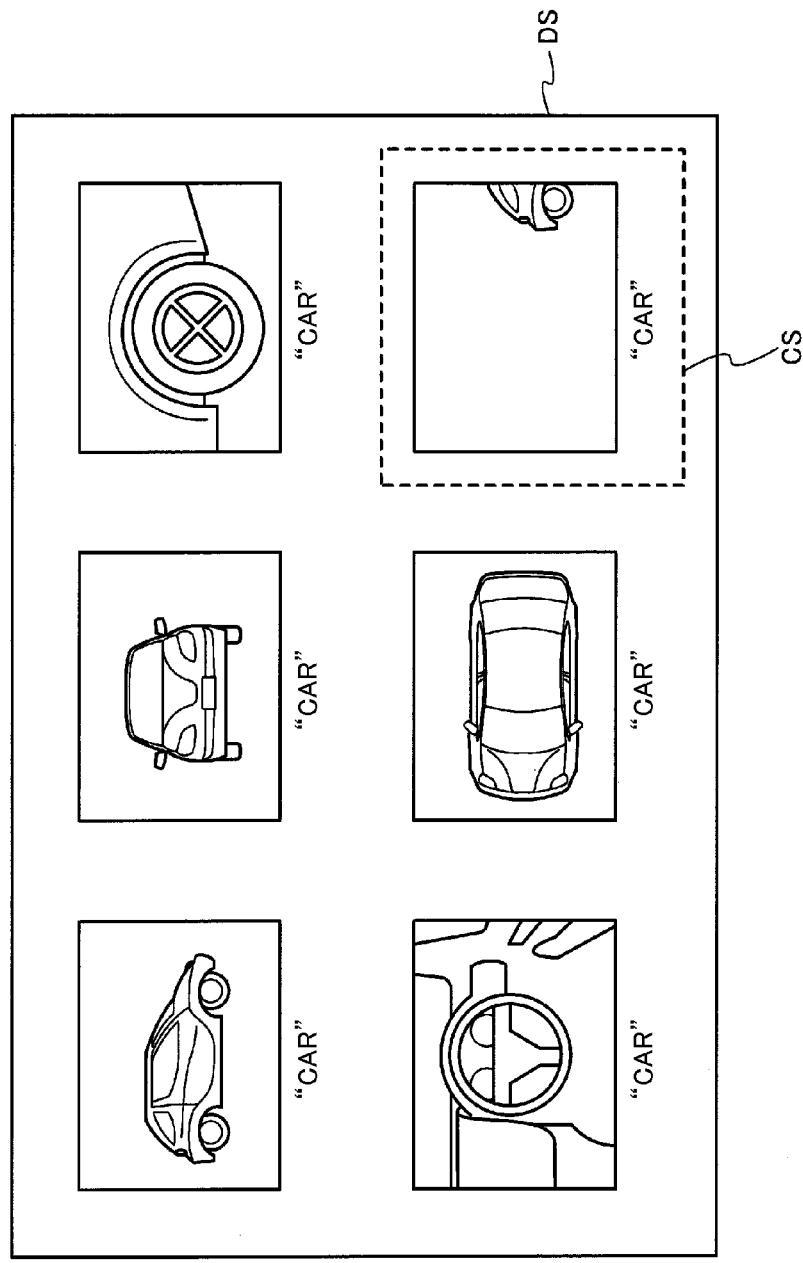
FIG. 11 is a view illustrating a process that displays a list of a processing target image group.

Specifically, a list of the processing target image group is displayed on a display section DS (see FIG. 11), and an image that has been determined by the user to be inappropriate as the processing target image (i.e., the image illustrated in FIG. 11 that is enclosed by the cursor CS) is edited or deleted.

This makes it possible to suppress a situation in which the learning process is performed using a processing target image that adversely affects the learning results, for example.

Note that information about a correct area that includes the object or the like that is represented by the correct answer label may be input as the correction instruction information. In this case, the processing section 120 may regenerate the processing target image so that the processing target image includes the object or the like that is represented by the correct answer label in an appropriate manner (e.g., at the center of the image).

When the image group is generated from the learning image or the processing target image, and the processing target image is generated, the area of the learning image occupied by the processing target image converges on the area that includes the car (see FIGS. 5A to 5C, for example). Specifically, it is possible to detect the presence and the position of the car within the original learning image.

The processing section 120 may perform an object detection process based on the classification score of each image of the image group.

This makes it possible to accurately detect the position of an object or the like (within the original learning image) that is represented by the correct answer label by repeating the process that generates the classifier data, for example.

Although an example in which the method according to the embodiments of the invention is applied to image recognition has been described above, the method according to the embodiments of the invention may also be applied to multimedia recognition (e.g., document recognition and voice recognition).

Note that part or most of the process performed by the image processing device and the like according to the embodiments of the invention may be implemented by a program or a computer-readable information storage device storing the program. In this case, the image processing device and the like according to the embodiments of the invention are implemented by causing a processor (e.g., CPU) to execute a program. Specifically, a program stored in an information storage device is read, and executed by a processor (e.g., CPU). The information storage device (computer-readable device) stores a program, data, and the like. The function of the information storage device may be implemented by an optical disk (e.g., DVD or CD), a hard disk drive (HDD), a memory (e.g., memory card or ROM), or the like. The processor (e.g., CPU) performs various processes according to the embodiments of the invention based on a program (data) stored in the information storage device. Specifically, a program that causes a computer (i.e., a device including an operation section, a processing section, a storage section, and an output section) to function as each section according to the embodiments of the invention (i.e., a program that causes a computer to execute the process implemented by each section) is stored in the information storage device.

The imaging device and the like according to the embodiments of the invention may include a processor and a memory. The processor may be a central processing unit (CPU), for example. Note that the processor is not limited to a CPU. Various types of processors such as a graphics processing unit (GPU) and a digital signal processor (DSP) may also be used. The processor may be a hardware circuit such as an application specific integrated circuit (ASIC). The memory stores a computer-readable instruction. Each section of the imaging device and the like according to the embodiments of the invention is implemented by causing the processor to execute the instruction. The memory may be a semiconductor memory (e.g., Static Random Access Memory (SRAM) or Dynamic Random Access Memory (DRAM)), a register, a hard disk, or the like. The instruction may be an instruction included in an instruction set of a program, or may be an instruction that causes a hardware circuit of the processor to operate.

Although only some embodiments of the invention have been described in detail above, those skilled in the art will readily appreciate that many modifications are possible in the embodiments without materially departing from the novel teachings and advantages of the invention. Accordingly, all such modifications are intended to be included within the scope of this invention. Any term cited with a different term having a broader meaning or the same meaning at least once in the specification and the drawings can be replaced by the different term in any place in the specification and the drawings. The configuration and the operation of the image processing device, the information storage device, and the like are not limited to those described in connection with the above embodiments. Various modifications and variations may be made of the above embodiments.

What is claimed is:

1. An image processing device comprising:
   an input reception section that performs a process that receives a learning image and a correct answer label assigned to the learning image;
   a processing section that performs a process that generates classifier data that is used to classify an image, and a processing target image that is used to generate the classifier data; and
   a storage section that stores the generated classifier data,
   the processing section generating the processing target image that is the entirety or part of the learning image, calculating a feature quantity of the processing target image, generating the classifier data based on training data that is a set of the feature quantity and the correct answer label that is assigned to the learning image that corresponds to the feature quantity, generating an image group based on the learning image or the processing target image, classifying each image of the generated image group using the classifier data to calculate a classification score of each image of the image group, and regenerating the processing target image based on the calculated classification score and the image group.

2. The image processing device as defined in claim 1, the processing section regenerating the classifier data based on new training data that is a set of the regenerated processing target image and the correct answer label that is assigned to an image selected from the image group when regenerating the processing target image.

3. The image processing device as defined in claim 1, the processing section comparing the classification score of each image of the image group with a given threshold value, selecting an image for which the classification score has been calculated to be equal to or higher than the given threshold value from the image group, and regenerating the processing target image based on a selected image group.

4. The image processing device as defined in claim 3, the processing section changing the given threshold value that is compared with the classification score each time the processing target image has been regenerated.

5. The image processing device as defined in claim 1, the processing section setting the entirety of the learning image to be a first processing target image.

6. The image processing device as defined in claim 1, the processing section generating the processing target image that is smaller in number of pixels or area than a preceding processing target image.

7. The image processing device as defined in claim 1, the processing section generating the image group based on the learning image, and generating the processing target image that is larger in number of pixels or area than a preceding processing target image.

8. The image processing device as defined in claim 1, the processing section repeating the process that generates the classifier data and the processing target image a given number of times.

9. The image processing device as defined in claim 1, the processing section stopping repeating the process that generates the classifier data and the processing target image when a difference in area or number of pixels between a preceding processing target image and a current processing target image is less than a given threshold value.

10. The image processing device as defined in claim 1, the processing section segmenting the learning image or the processing target image into a plurality of areas to generate the image group that is a set of images that respectively correspond to the plurality of areas.

11. The image processing device as defined in claim 1, the processing section overlap-segmenting the learning image or the processing target image into a plurality of areas to generate the image group that is a set of images that respectively correspond to the plurality of areas.

12. The image processing device as defined in claim 1, the processing section over-segmenting the learning image or the processing target image into a plurality of areas to generate the image group that is a set of images that respectively correspond to the plurality of areas.

13. The image processing device as defined in claim 10, the processing section changing a segmentation size of the learning image or the processing target image each time the process that generates the classifier data and the processing target image has been performed.

14. The image processing device as defined in claim 1, the processing section displaying a processing target image group on a display section, acquiring correction instruction information that instructs to correct the processing target image group, and performing a correction process on the processing target image group based on the correction instruction information.

15. The image processing device as defined in claim 14, the processing section displaying a list of the processing target image group on the display section, acquiring designation information that designates an unnecessary processing target image from the processing target image group as the correction instruction information, and deleting the processing target image designated by the designation information from the processing target image group.

16. The image processing device as defined in claim 1, the processing section calculating the feature quantity of the processing target image using a bag of features.

17. The image processing device as defined in claim 1, the processing section performing an object detection process based on the classification score of each image of the image group.

18. A non-transitory information storage device storing a program that causes a computer to perform steps of:
performing a process that receives a learning image and a correct answer label assigned to the learning image;
performing a process that generates classifier data that is used to classify an image, and a processing target image that is used to generate the classifier data; and
storing the generated classifier data,
while regenerating the processing target image that is the entirety or part of the learning image, calculating a feature quantity of the processing target image, generating the classifier data based on training data that is a set of the feature quantity and the correct answer label that is assigned to the learning image that corresponds to the feature quantity, generating an image group based on the learning image or the processing target image, classifying each image of the generated image group using the classifier data to calculate a classification score of each image of the image group, and regenerating the processing target image based on the calculated classification score and the image group.

19. An image processing method comprising:
performing a process that receives a learning image and a correct answer label assigned to the learning image;
generating a processing target image that is used to generate classifier data that is used to classify an image, the processing target image being the entirety or part of the learning image;
calculating a feature quantity of the processing target image;
generating the classifier data based on training data that is a set of the feature quantity and the correct answer label that is assigned to the learning image that corresponds to the feature quantity;
generating an image group based on the learning image or the processing target image;
classifying each image of the generated image group using the classifier data to calculate a classification score of each image of the image group;

regenerating the processing target image based on the calculated classification score and the image group; and
storing the generated classifier data.

* * * * *